United States Patent
Edlund et al.

(10) Patent No.: US 6,547,858 B1
(45) Date of Patent: Apr. 15, 2003

(54) HYDROGEN-PERMEABLE METAL MEMBRANE AND HYDROGEN PURIFICATION ASSEMBLIES CONTAINING THE SAME

(75) Inventors: David J. Edlund, Bend, OR (US); William A. Pledger, Sisters, OR (US); Todd Studebaker, Bend, OR (US)

(73) Assignee: IdaTech, LLC, Bend, OR (US)

( * ) Notice: Subject to any disclaimer, the term of this patent is extended or adjusted under 35 U.S.C. 154(b) by 0 days.

(21) Appl. No.: 09/618,866

(22) Filed: Jul. 19, 2000

Related U.S. Application Data

(63) Continuation-in-part of application No. 09/274,154, filed on Mar. 22, 1999, now Pat. No. 6,152,995.
(60) Provisional application No. 60/191,891, filed on Mar. 23, 2000.

(51) Int. Cl.[7] .......................... B01D 53/22; B01D 67/00
(52) U.S. Cl. ...................... 96/4; 95/55; 95/56; 96/11; 216/53
(58) Field of Search ..................... 96/4, 11; 95/45, 95/55, 56; 216/46, 53, 100, 108

(56) References Cited

U.S. PATENT DOCUMENTS

| | | | |
|---|---|---|---|
| 3,208,198 A | 9/1965 | Rubin | 55/16 |
| 3,356,538 A | 12/1967 | Miekka et al. | 216/100 X |
| 3,469,372 A | 9/1969 | Yamauchi et al. | 96/11 |
| 3,665,680 A | 5/1972 | Heuser | 55/158 |
| 3,713,270 A | 1/1973 | Farr et al. | 55/16 |
| 3,839,110 A | 10/1974 | Shankoff | 216/108 |
| 3,849,076 A | 11/1974 | Gryaznov et al. | 422/140 |
| 4,132,668 A | 1/1979 | Gryaznov et al. | 252/430 |
| 4,197,152 A | 4/1980 | Palty et al. | 252/364 |
| 4,329,157 A | 5/1982 | Dobo et al. | 55/16 |
| 4,650,814 A | 3/1987 | Keller | 518/703 |
| 4,654,063 A | 3/1987 | Auvil et al. | 62/18 |
| 4,684,581 A | 8/1987 | Struthers | 429/19 |

(List continued on next page.)

FOREIGN PATENT DOCUMENTS

| | | | |
|---|---|---|---|
| EP | 1065741 A2 | 1/2001 | |
| JP | 1-262903 | 10/1989 | 96/11 |
| WO | WO 99/30806 | 6/1999 | |

OTHER PUBLICATIONS

English Language Abstract of Japanese Patent No. 1–262903, 1989.

Menzer, R., et al., "Fuel Processing in Fuel Cell Systems for Mobile Applications—Gasoline as Energy Carrier On–Bord," Fifth Grove Fuel Cell Symposium, Commonwealth Institute, London, U.K., (no page No.), (Sep. 22–25, 1997).

Minet, R. G., et al., "Experimental Studies of A Ceramic Membrane Reactor for the Steam/Methane Reaction at Moderate Temperatures (400–700°C)," Symposium on Natural Gas Upgrading II Presented before The Division of Petroleum Chemistry, Inc., Meeting of American Chemical Society, San Francisco, California, U.S.A., pp. 245–248 (Apr., 1992).

(List continued on next page.)

*Primary Examiner*—Richard L. Chiesa
(74) *Attorney, Agent, or Firm*—Kolisch Hartwell, P.C.

(57) ABSTRACT

A hydrogen-permeable metal membrane with increased hydrogen flux compared to conventional metal membranes is disclosed. Without sacrificing selectivity, the membrane enables a greater throughput of purified hydrogen. A method for preparing the invention includes at least one etching step in which a controlled volume of etchant is used to selectively remove material from the membrane's surface. Methods for repairing holes or other defects in the membrane are also disclosed. The invention also includes a membrane module adapted for use in purifying hydrogen streams, such as those produced by fuel processors.

24 Claims, 5 Drawing Sheets

U.S. PATENT DOCUMENTS

| | | | |
|---|---|---|---|
| 4,713,234 A | 12/1987 | Weirich et al. | 423/648 R |
| 4,810,485 A | 3/1989 | Marianowski et al. | 423/648.1 |
| 5,215,729 A | 6/1993 | Buxbaum | 96/56 X |
| 5,326,550 A | 7/1994 | Adris et al. | 423/652 |
| 5,354,547 A | 10/1994 | Rao et al. | 423/650 |
| 5,393,325 A | 2/1995 | Edlund | 95/56 |
| 5,449,848 A | 9/1995 | Itoh | 585/430 |
| 5,498,278 A | 3/1996 | Edlund | 96/11 |
| 5,509,942 A | 4/1996 | Dodge | 29/623.2 |
| 5,525,322 A | 6/1996 | Willms | 423/653 |
| 5,612,012 A | 3/1997 | Soma et al. | 423/246 |
| 5,637,259 A | 6/1997 | Galuszka et al. | 252/373 |
| 5,639,431 A | 6/1997 | Shirasaki et al. | 422/212 |
| 5,645,626 A | 7/1997 | Edlund et al. | 95/56 |
| 5,658,681 A | 8/1997 | Sato et al. | 429/13 |
| 5,705,082 A | 1/1998 | Hinson | 216/100 X |
| 5,705,916 A | 1/1998 | Rudbeck et al. | 322/2 R |
| 5,734,092 A | 3/1998 | Wang et al. | 73/23.25 |
| 5,782,960 A | 7/1998 | Ogawa et al. | 96/11 |
| 5,814,112 A | 9/1998 | Elliot et al. | 48/197 R |
| 5,861,137 A | 1/1999 | Edlund | 423/652 |
| 5,931,987 A | 8/1999 | Buxbaum | 95/55 |
| 6,152,995 A | 11/2000 | Edlund | 96/4 |
| 6,168,650 B1 | 1/2001 | Buxbaum | 95/55 |
| 6,183,543 B1 | 2/2001 | Buxbaum | 96/11 |
| 6,221,117 B1 | 4/2001 | Edlund et al. | 95/56 X |
| 6,395,405 B1 | 5/2002 | Buxbaum | 95/55 X |
| 6,419,726 B1 | 7/2002 | Frost et al. | 95/56 |

OTHER PUBLICATIONS

Oertel, Michael, et al., "Steam Reforming of Natural Gas with Integrated Hydrogen Separation for Hydrogen Production," Chemical Engineering Techology, vol. 10, pp. 248–255 (1987).

Shu, J., et al., "Catalytic Palladium–Based Membrane Reactors: A Review," The Canadian Journal of Chemical Engineering, vol. 69, pp. 1036–1060 (Oct., 1991).

Teagan, W. P., et al., "Cost Reduction of Fuel Cells for Transportation Applications—Fuel Processing Options," Fifth Grove Fuel Cell Symposium, Commonwealth Institute, London, U.K. (Sep. 22–25, 1997).

Emonts, B., et al., "Compact Methanol Reformer Test for Fuel–Cell Powered Light–Duty Vehicles," Fifth Grove Fuel Cell Symposium, Commonwealth Institute, London, U.K., (no page No.), (Sep. 22–25, 1997).

Jørgensen, S. Lægsgaard, et al., "Application of Pd–Membranes for the Production of Pure Hydrogen in Methanol–Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51–57 (May 30–31, 1997).

Knapton, A. G., "Palladium Alloys for Hydrogen Diffusion Membranes," Platinum Metals Review, vol. 21, 44–50 (1977).

Ledjeff–Hey, K., et al., "Compact Hydrogen Production Systems for Solid Polymer Fuel Cells," Fifth Grove Fuel Cell Symposium, Commonwealth Institute, London, U.K., p. 17 (Sep. 22–25, 1997).

"Compact, Lightweight Fuel Reformer for Fuel Cells," Argonne National Laboratory/U.S. Department of Energy (Jul., 1996).

Edlund, Dr. David and William Pledger, "Development of a Compact and Economical Steam Reformer for Fuel–Cell Systems," Fifth Grove Fuel Cell Symposium, Commonwealth Institute, London, U.K., p. 6 (Sep. 22–23, 1997).

Edlund, David J. and William A. Pledger, "The Practical Use of Metal–Membrane Reactors for Industrial Applications," The 1995 Membrane Technology Reviews, pp. 89–97 (Nov., 1994).

Emonts, B., et al., "Compact Methanol Reformer Test for Fuel–Cell Powered Light–Duty Vehicles," Fifth Grove Fuel Cell Symposium, Commonwealth Institute, London, U.K., p. 42 (Sep. 22–25, 1997).

Adris, A. M., et al., "A Fluidized Bed Membrane Reactor for the Steam Reforming of Methane," The Canadian Journal of Chemical Engineering, vol. 69, pp. 1061–1070 (Oct., 1991).

Amphlett, J. C., et al., "On Board Hydrogen Purification for Steam Reformer/PEM Fuel Cell Vehicle Power Plants," Energy Progress X, Proceedings of the $10^{th}$ World Hydrogen Energy Conference, Cocoa Beach, Florida, U.S.A., vol. 3, pp. 1681–1690 (Jun. 1994).

Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22–25, 1997).

Chai, M., et al., "Promotion of Methane Steam Reforming Using Ruthenium–Dispersed Microporous Alumina Membrane Reactor," Chemistry Letters, The Chemical Society of Japan, pp. 41–44 (1993).

HYDROGEN-PERMEABLE METAL MEMBRANE AND HYDROGEN PURIFICATION ASSEMBLIES CONTAINING THE SAME

RELATED APPLICATIONS

The present application is a continuation-in-part application claiming priority to U.S. patent application Ser. No. 09/274,154, which was filed on Mar. 22, 1999, is entitled "Hydrogen-Permeable Metal Membrane and Method for Producing the Same," and issued on Nov. 28, 2000 as U.S. Pat. No. 6,152,995, and the disclosure of which is hereby incorporated by reference. This application also claims priority to U.S. Provisional Patent Application Ser. No. 60/191,891, which was filed on Mar. 23, 2000, is entitled "Hydrogen-Selective Metal Membranes and Method of Forming the Same," and the disclosure of which is hereby incorporated by reference.

FIELD OF THE INVENTION

The present invention relates generally to hydrogen-permeable membranes, and more particularly to a hydrogen-permeable membrane with increased hydrogen permeability and a method for producing the same.

BACKGROUND OF THE INVENTION

In particular, planar palladium-alloy membranes have been disclosed for purifying hydrogen gas streams, such as hydrogen gas streams produced by steam reformers, autothermal reformers, partial oxidation reactors, pyrolysis reactors and other fuel processors, including fuel processors configured to supply purified hydrogen to fuel cells or other processes requiring high-purity hydrogen.

To be economical, palladium and palladium-alloy membranes must be thin. For example, planar membranes are typically approximately 0.001 inches thick. However, these extremely thin membranes are subject to wrinkling during assembly into a form for use in a fuel processing system, such as assembly into a membrane module containing a plurality of membranes. A membrane that has one or more wrinkles is subject to premature failure due to stress fractures forming at the wrinkle. When such a failure occurs, impurities that otherwise would be unable to pass through the membrane can now pass through the membrane, thereby reducing the purity of the product hydrogen stream and potentially damaging the fuel cell stack or other device with which the purified stream is used.

Purified hydrogen is used in the manufacture of many products including metals, edible fats and oils, and semiconductors and microelectronics. Purified hydrogen is also an important fuel source for many energy conversion devices, such as fuel-cell systems, and especially proton-exchange-membrane fuel-cell (PEMFC) systems.

Hydrogen gas streams may be produced by fuel processors that produce hydrogen gas by chemically reacting one or more feed streams. These fuel processors often require that the initial hydrogen stream be purified before the stream is suitable for use in a particular application, such as a feed stream to a fuel cell.

An example of a suitable fuel processor is a steam reformer, which produces hydrogen gas by reacting a hydrocarbon or alcohol with water. Other examples of suitable fuel processors produce hydrogen gas by autothermal reforming, partial oxidation of a hydrocarbon or alcohol vapor, by a combination of partial oxidation and steam reforming a hydrocarbon or an alcohol vapor, by pyrolysis of a hydrocarbon or alcohol vapor, and by electrolysis of water. Examples of suitable fuel processors and fuel cell systems incorporating the same are disclosed in U.S. Pat. Nos. 5,861,137 and 5,997,594, and U.S. patent application Ser. No. 09/190,917, now U.S. Pat. No. 6,376,113, which was filed on Nov. 12, 1998 and is entitled "Fuel Processing System," and the disclosures of which are hereby incorporated by reference.

SUMMARY OF THE INVENTION

The invention includes a hydrogen-permeable metal membrane with increased hydrogen flux compared to conventional hydrogen-permeable metal membranes. Without sacrificing selectivity or purity, the membrane enables a greater hydrogen throughput. A method for preparing the membrane includes at least one etching step in which a volume of etchant is used to selectively remove material from the membrane's surface. Methods for detecting and repairing holes or other defects in the membrane are also disclosed. The invention also includes a membrane module adapted for use in purifying hydrogen streams, such as those produced by fuel processors.

Many other features of the present invention will become manifest to those versed in the art upon making reference to the detailed description which follows and the accompanying drawings in which preferred embodiments incorporating the principles of this invention are disclosed as illustrative examples only.

DETAILED DESCRIPTION OF THE INVENTION

Figure 1:
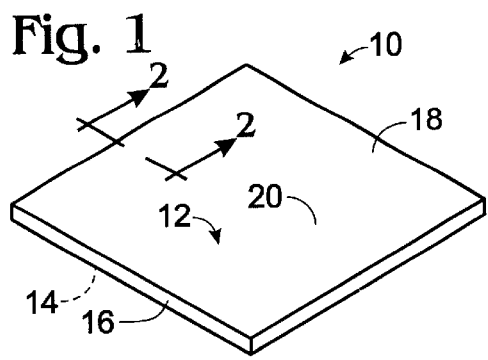
FIG. 1 is an isometric view of an unetched hydrogen-permeable metal membrane.

An unetched hydrogen-permeable membrane is shown in FIG. 1 and indicated generally at 10. Membrane 10 includes a pair of generally opposed surfaces 12 and 14 and an edge 16 joining the perimeters of the surfaces. Each surface 12 and 14 includes an outer edge region 18 that surrounds a central region 20. Membrane 10 is typically roll formed and, as shown, has a generally rectangular, sheet-like configuration with a constant thickness. It should be understood that membrane 10 may have any geometric or irregular shape, such as by cutting the formed membrane into a desired shape based on user preferences or application requirements. It is within the scope of the invention that any suitable method for forming membrane 10 may be used. For example, membrane 10 may also be formed from such processes as electro deposition, sputtering or vapor deposition.

Figure 2:
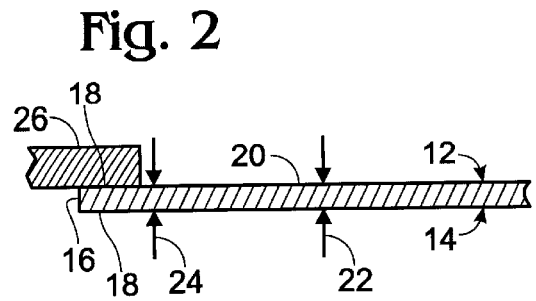
FIG. 2 is a cross-sectional detail of the membrane of FIG. 1 with an attached frame.

In FIG. 2, membrane 10 is shown in cross-section, and it can be seen that the thickness 22 of the membrane measured between the central regions is the same as the thickness 24 measured between the edge regions. In the figures, it should be understood that the thicknesses of the membranes and subsequently described absorbent media and frame have been exaggerated for purposes of illustration. Typically, hydrogen-permeable membranes have thicknesses less than approximately 50 microns, although the disclosed etching process may be used with thicker membranes.

Also shown in FIG. 2 is a portion of a frame 26, which may be secured to the membrane, such as around a portion or the entire edge region 18. Frame 26 is formed from a more durable material than the membrane and provides a support structure for the membrane. Frame 26 may be secured to one or both surfaces of the membrane. It should be understood that the invented membrane may be formed without frame 26. In another variation, frame 26 may take the form of a compressible gasket that is secured to the membrane, such as with an adhesive or other suitable structure or process. Compressible gaskets are used to form gas-tight seals around and/or between the membranes.

In use, membrane 10 provides a mechanism for removing hydrogen from mixtures of gasses because it selectively allows hydrogen to permeate through the membrane. The flowrate, or flux, of hydrogen through membrane 10 typically is accelerated by providing a pressure differential between a mixed gaseous mixture on one side of the membrane, and the side of the membrane to which hydrogen migrates, with the mixture side of the membrane being at a higher pressure than the other side.

Membrane 10 is formed of a hydrogen-permeable metal or metal alloy, such as palladium or a palladium alloy. An example of such an alloy is comprised of 60 wt % palladium and 40 wt % copper (generally known as Pd-40Cu). Because palladium and palladium alloys are expensive, the thickness of the membrane should be minimal; i.e., as thin as possible without introducing an excessive number of holes in the membrane. Holes in the membrane are not desired because holes allow all gaseous components, including impurities, to pass through the membrane, thereby counteracting the hydrogen-selectivity of the membrane.

It is known to roll form hydrogen-permeable metal membranes, such as membrane 10, to be very thin, such as with thicknesses of less than approximately 50 microns, and more commonly with thicknesses of approximately 25 microns. The flux through a hydrogen-permeable metal membrane is inversely proportional to the membrane thickness. Therefore, by decreasing the thickness of the membrane, it is expected that the flux through the membrane will increase, and vice versa. In Table 1, below, the expected flux of hydrogen through various thicknesses of Pd-40Cu membranes is shown.

TABLE 1

Expected hydrogen flux through Pd—40Cu membranes at 400° C. and 100 psig hydrogen feed, permeate hydrogen at ambient pressure.

| Membrane Thickness | Expected Hydrogen Flux |
| --- | --- |
| 25 micron | 60 mL/cm$^2$ · min |
| 17 micron | 88 mL/cm$^2$ · min |
| 15 micron | 100 mL/cm$^2$ · min |

Besides the increase in flux obtained by decreasing the thickness of the membrane, the cost to obtain the membrane also increases as the membrane's thickness is reduced. Also, as the thickness of a membrane decreases, the membrane becomes more fragile and difficult to handle without damaging.

Through the etching process, or method, of the present invention, discussed in more detail subsequently, the thickness of a portion of the membrane, such as central portion 20, may be selectively reduced, while leaving the remaining portion of the membrane, such as edge region 18, at its original thickness. Therefore, greater flux is obtained in the thinner etched region, while leaving a thicker, more durable edge region that bounds the central region and thereby provides support to the membrane.

Figure 3:
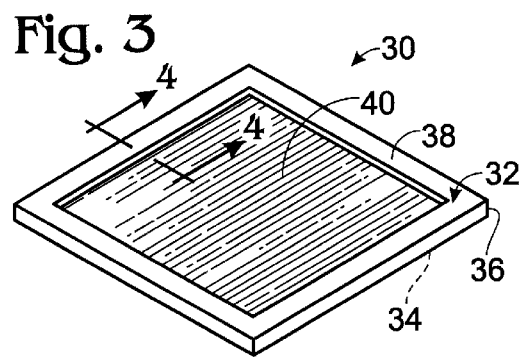
FIG. 3 is an isometric view of the membrane of FIG. 1 after being etched according to a method of the present invention.
Figure 4:
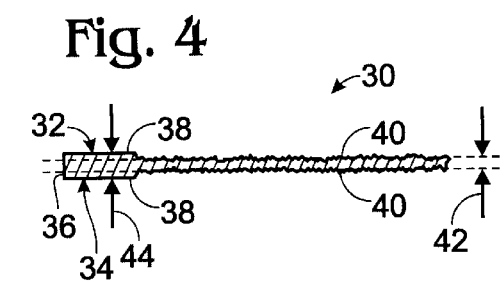
FIG. 4 is a cross-sectional detail of the membrane of FIG. 3.

For example, an etched membrane prepared according to an etching method of the present invention is shown in FIG. 3 and illustrated generally at 30. Like membrane 10, membrane 30 includes a pair of generally opposed surfaces 32 and 34 and an edge 36 joining the surfaces. Each surface 32 and 34 includes an outer edge region 38 that surrounds a central region 40. Membrane 30 is formed from any of the above-discussed hydrogen-permeable metal materials, and may have any of the above-discussed configurations and shapes. Unlike membrane 10, however, the thickness of membrane 30 measured between central regions 40 is less than the thickness 44 measured between the edge regions, as schematically illustrated in FIG. 4. Therefore, the hydrogen flux through the central region will be greater than that through the edge region, as expected from the above discussion of the inversely proportional relationship between membrane thickness and hydrogen flux.

However, an unexpected benefit of chemically etching the membrane, as disclosed herein, is that the hydrogen flux through the etched region exceeds that expected or measured through roll-formed membranes of equal thickness. As shown below in Table 2, the method of the present invention yields a hydrogen-permeable metal membrane with significantly greater flux than unetched membranes of similar thicknesses.

TABLE 2

Hydrogen flux through etched and unetched Pd—40Cu membranes at 400° C. and 100 psig hydrogen feed, permeate hydrogen at ambient pressure. Aqua regia etchant.

| Etching Time | Membrane Thickness | Observed Hydrogen Flux | Expected Hydrogen Flux |
| --- | --- | --- | --- |
| None | 25 micron | 60 mL/cm$^2$ · min | 60 mL/cm$^2$ · min |
| 2.0 mins. | 17 micron | 94 mL/cm$^2$ · min | 88 mL/cm$^2$ · min |
| 2.5 mins. | 15 micron | 122 mL/cm$^2$ · min | 100 mL/cm$^2$ · min |

As the above table demonstrates, the invented method produces hydrogen-permeable metal membranes that permit increased hydrogen throughput compared to unetched membranes of similar thickness by increasing the roughness and surface area of the etched region of the membrane. Perhaps more importantly, this increase in throughput is achieved without sacrificing selectivity for hydrogen or the purity of the harvested hydrogen gas, which is passed through the membrane.

Increasing the surface roughness of the membrane is especially beneficial as the thickness of the membrane is reduced to less than 25 microns, especially less than 20 microns. As the membrane thickness is reduced, the surface reaction rates governing the transport of gaseous molecular hydrogen onto the surface of the metal membrane become more important to the overall permeation rate of hydrogen across the membrane. In extreme cases in which the membrane is quite thin (less than approximately 15 microns) the surface reaction rates are significant in governing the overall permeation rate of hydrogen across the membrane. Therefore, increasing the surface area increases the rate of hydrogen permeation. This contrasts with relatively thick membranes (greater than 25 microns) in which the surface reaction rates are less important and the overall permeation rate of hydrogen across the membrane is governed by the bulk diffusion of hydrogen through the membrane.

Thus the etching process results in an overall reduction in the thickness of the membrane and an increase in the surface roughness (and surface area) of the membrane. These improvements yield an increase in hydrogen flux and reduce the amount of material (e.g., palladium alloy) that is required, while still maintaining the membrane's selectivity for hydrogen.

In the invented etching process, an etchant is used to selectively reduce the thickness of the membrane. When the etchant removes, or etches, material from the surface of a membrane, the etchant also increases the surface roughness and surface area of the membrane in the etched region.

Examples of suitable etchants are oxidizing agents and acids. For example, oxidizing acids such as nitric acid. Other suitable examples are combinations of nitric acid with other acids, such as aqua regia (a mixture of 25 vol % concentrated nitric acid and 75 vol % concentrated hydrochloric acid). Another specific example of an etchant well-suited to use in the present invention is a mixture comprising 67 wt % concentrated nitric acid and 33 wt % aqueous solution of poly(vinyl alcohol). A suitable method of preparing the aqueous solution of poly(vinyl alcohol) is to dissolve 4 wt % of poly(vinyl alcohol) (average molecular weight 124,000 to 186,000; 87% to 89% hydrolyzed; Aldrich Chemical Company, Milwaukee, Wis.) in de-ionized water. The disclosed examples of etchants are for illustrative purposes, and should not be construed to be limiting examples. For example, the relative percentage of acid may be increased or decreased to make the etchant respectively more or less reactive, as desired.

In a first method of the present invention, a selected etchant is applied to at least one of the surfaces of the membrane. Once applied, the etchant removes material from the surface of the membrane, thereby increasing its surface roughness and reducing the thickness of the membrane in the etched region. After a defined time period, the etchant is removed. The etching process disclosed herein typically is conducted under ambient conditions (temperature and pressure), although it should be understood that the process could be conducted at elevated or reduced temperatures and pressures as well.

The etching process is limited either by the time during which the membrane is exposed to the etchant, or by the reactive elements of the etchant. In the latter scenario, it should be understood that the etching reaction is self-limiting, in that the reaction will reach an equilibrium state in which the concentration of dissolved membrane in the etchant solution remains relatively constant. Regardless of the limiting factor in the process, it is important to apply a volume and concentration of etchant for a time period that will not result in the etchant creating substantial holes in, or completely dissolving, the membrane. Preferably, no holes are created in the membrane during the etching process.

When applying the etchant to a surface of membrane 10, such as to produce membrane 30, it is desirable to control the region of the surface over which the etchant extends. It is also desirable to maintain an even distribution of etchant over this application region. If the application region of the etchant is not controlled, then the etchant may remove material from other non-desired regions of the membrane, such as the edge region, or may damage materials joined to the membrane, such as an attached frame. If an even distribution of etchant is not maintained, areas of increased etchant may have too much material removed, resulting in holes in the membrane. Similarly, other areas may not have enough material removed, resulting in less than the desired reduction in thickness and increase in flux.

To control the distribution of etchant within the desired application region, an absorbent medium is placed on the membrane 10 and defines an application region to be etched. For example, in FIGS. 5 and 6, the absorbent medium is generally indicated at 50 and covers application region 52 of surface 12. As shown, medium 50 is sized to cover only a central portion of surface 12, however, it should be understood that medium 50 may be selectively sized to define application regions of any desired size and shape, up to the complete expanse of surface 12. Typically, however, only a central portion of each surface is treated, leaving an unetched perimeter of greater thickness than the central region. This unetched region, because of its greater thickness, provides strength and support to membrane 10 while still contributing to the hydrogen permeability of the membrane.

Besides being selected to absorb the particular etchant without adversely reacting to the etchant or metal membrane, it is preferable that medium 50 has a substantially uniform absorbency and diffusivity along its length. When medium 50 absorbs and distributes the etchant uniformly along its length, it distributes the etchant evenly across the application region, thereby removing substantially the same amount of material across the entire application region. The benefit of this is not only that some etchant will contact, and thereby remove material from the entire application region, but also that the etchant will be uniformly distributed across the application region. Therefore, membrane 50 prevents too much etchant being localized in an area, which would result in too much material being removed. In a region where too much etchant is applied, the excess etchant is drawn away from that region to other areas of the medium where less etchant is applied. Similarly, in a region where too little etchant is applied, the medium draws etchant to that region to produce an even distribution across the medium, and thereby across the application region.

As a result, the reduction of thickness in membrane 10 will be relatively uniform across the application region, and perhaps, more importantly, will be reproducible regardless of the exact rate and position at which the etchant is applied. Therefore, with the same size and type of medium 50 and the same volume of etchant 54, the resulting reduction in thickness should be reproducible for membranes of the same composition. Of course, it should be understood that etching removes material from the surface of the membrane, thereby resulting in an uneven, rough surface with increased surface area over an unetched surface. Therefore, the exact surface topography will not be seen. However, the average thickness measured across a section of the membrane should be reproducible. For example, in FIG. 4, the average thickness between central regions 40 is indicated with dashed lines.

Figure 5:
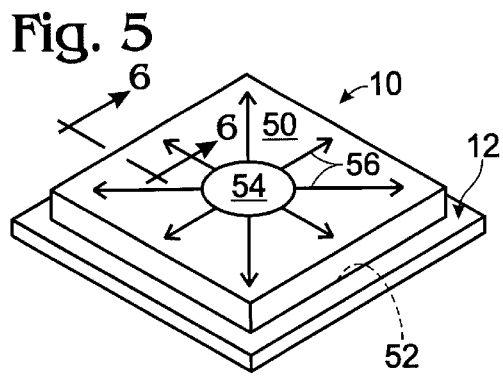
FIG. 5 is an isometric view of the membrane of FIG. 1 with an absorbent medium placed over an application region of one of the membrane's surfaces.
Figure 6:
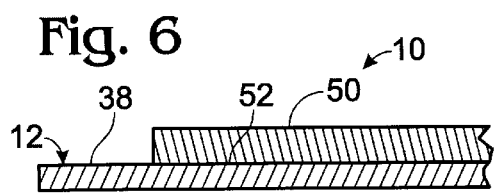
FIG. 6 is a cross-sectional detail of the membrane of FIG. 5.

Because medium 50 essentially defines the bounds of application region 52, medium 50 should be sized prior to placing it upon the surface to be etched. After placing the medium in the desired position on one of the membrane's surfaces, such as surface 12 shown in FIG. 5, a volume of etchant is applied. In FIG. 5, the applied volume of etchant is schematically illustrated at 54, with arrows 56 illustrating the absorption and distribution of etchant 54 across medium 50.

The applied volume of etchant should be no more than a saturation volume of etchant. An absorbent medium can only absorb up to a defined volume of a particular etchant per unit of medium 50 before reaching the saturation point of the medium. Therefore, it is important not to exceed this saturation point. Too much applied etchant will result in unabsorbed etchant pooling on or adjacent to the medium, such as on the upper surface of the medium 50 or around the edges of the medium. When excess etchant contacts the surface, it is likely to result in holes in the membrane because more than the desired amount of material is removed. As discussed, if these holes are numerous or large enough, they will render the membrane unusable for hydrogen purification applications, with any holes lowering the purity of the hydrogen passing through the membrane.

Therefore, to prevent too much etchant from being applied, the volume of etchant applied may approach, but should not exceed, the saturation volume of the etchant.

An example of a suitable absorbent medium is a cellulosic material, such as absorbent paper products. A particular example of an absorbent medium that has proven effective are single-fold paper towels manufactured by the Kimberly Clark company. When a three inch by three inch area of such a towel is used, approximately 2.5 mL of etchant may be applied without exceeding the saturation volume of that area. The capillary action of the cellulosic towel both absorbs the applied etchant and distributes the etchant throughout the towel. Other paper and cellulosic materials may be used as well, as long as they meet the criteria defined herein. Absorbent, diffusive materials other than cellulosic materials may be used as well.

After applying the etchant to medium 50, the etchant is allowed to remove material from the application region for a determined time period. This period is best determined through experimentation and will vary depending on such factors as the composition, thickness and desired thickness of the membrane, the absorbent medium being used, the composition and concentration of etchant, and the temperature at which the etching process is conducted. After this time period has passed, the medium is removed from the membrane, and the application, or treatment area is rinsed with water to remove any remaining etchant. After rinsing, the method may be repeated to etch another surface of the membrane.

Instead of a single etching step on each surface of the membrane, a variation of the above method includes plural etching steps for each surface to be etched. In the first step, a more reactive, or vigorous etchant is used to remove a substantial portion of the material to be removed. In the second step, a less reactive etchant is used to provide a more controlled, even etch across the application region.

As an illustrative example, Pd-40Cu alloy foil was etched first with concentrated nitric acid for 20–30 seconds using the absorbent medium technique described above. After removing the medium and rinsing and drying the membrane, a second etch with a mixture of 20 vol % neat ethylene glycol and the balance concentrated nitric acid was performed for between 1 and 4 minutes. Subsequent etching steps were performed with the glycol mixture to continue to gradually reduce the thickness of the membrane in the application region. Results of etching Pd-40Cu foil using this method are given in the table below.

TABLE 3

Results of etching Pd—40Cu membrane with concentrated nitric acid for 30 seconds followed by subsequent etches with concentrated nitric acid diluted with 20% vol ethylene glycol.

| Etching Solution | Etching Time | Observations |
| --- | --- | --- |
| None (Virgin Pd—40Cu Foil) | N/A | Measures 0.0013 inches thick |
| 1) Conc. Nitric Acid<br>2) 20 vol % ethylene glycol/HNO$_3$ | 1) 30 seconds<br>2) 1.5 minutes | Measures 0.0008 to 0.0009 inches thick, no pin holes |
| 1) Conc. Nitric Acid<br>2) 20 vol % ethylene glycol/HNO$_3$<br>3) 20 vol % ethylene glycol/HNO$_3$ | 1) 30 seconds<br>2) 1.5 minutes<br>3) 1.5 minutes | Measures 0.0005 to 0.0006 inches thick, no pin holes |
| 1) Conc. Nitric Acid<br>2) 20 vol % ethylene glycol/HNO$_3$ | 1) 30 seconds<br>2) 3 minutes | Measures 0.0005 inches thick, no pin holes in membrane |
| 1) Conc. Nitric Acid<br>2) 20 vol % ethylene glycol/HNO$_3$ | 1) 1 minute<br>2) 3 minutes | Multiple pin holes in membrane |

Other than confining the etching solution to a desired application region, another benefit of using an absorbent medium to control the placement and distribution of the etchant is that the quantity of etchant (or etching solution) that may be applied without oversaturating the medium is limited. Thus, the etching reaction may be self-limiting, depending on the choice of and composition of etchant. For instance, varying the etching time using 33.3 wt % PVA solution/66.7 wt % concentrated HNO$_3$ yielded the results shown in the following table. These results indicate that the volume of etchant that is applied at one time may limit the depth of etching, so long as the etchant is not so reactive or applied in sufficient quantity to completely dissolve the application region.

TABLE 4

Results of etching Pd—40Cu membrane with a solution of 33.3 wt % PVA solution/66.7 wt % concentrated nitric acid.

| Etching Time | Observations |
| --- | --- |
| 0 | Measures 0.0013 inches thick |
| 3 minutes | Measures 0.0011 inches thick |
| 4 minutes | Measures 0.0011 inches thick |
| 5 minutes | Measures 0.0011 inches thick |
| 6 minutes | Measures 0.0011 inches thick |
| 3 minutes, rinse, 3 minutes | Measures 0.0008 to 0.0009 inches thick |
| 3 minutes, rinse, 3 minutes, rinse, 3 minutes | Measures 0.0006 inches thick, multiple pin holes |

In a further variation of the etching method, a suitable mask may be applied to the membrane to define the boundaries of the region to be etched. For example, in FIG. 5, instead of using absorbent medium 50 to define application region 52, a non-absorbent mask could be applied around edge region 38. Because this mask does not absorb the etchant, it confines the etchant to an application region bounded by the mask. Following etching, the mask is removed. The mask may be applied as a liquid or it may be a film with an adhesive to bond the film to the membrane.

Figure 7:
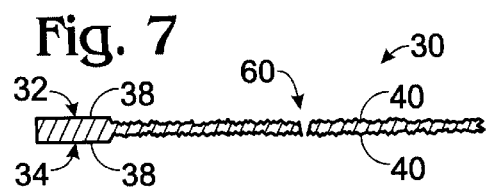
FIG. 7 is the detail of FIG. 4 with a hole indicated generally at 60.

If the chemical etching process is not properly controlled, tiny holes will appear in the membrane. For example, in FIG. 7 membrane 30 is shown with a hole 60 in its central region 40. Typically, the holes will be very small, however, the size of a particular hole will depend on the concentration and quantity of etchant applied to that region, as well as the time during which the etchant was allowed to etch material from the membrane. Holes, such as hole 60, reduce the purity of the hydrogen gas harvested through the membrane, as well as the selectivity of the membrane for hydrogen. The probability of holes forming in the membrane during the etching process increases as the thickness of the membrane is reduced. Therefore, there is often a need to repair any holes formed during the etching process.

Figure 8:
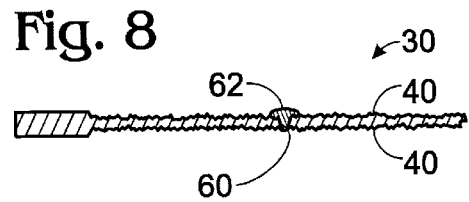
FIG. 8 is the detail of FIG. 7 with the hole repaired.

One method for detecting any such holes is to utilize a light source to identify holes in the membrane. By shining a light on one side of the membrane, holes are detected where light shines through the other side of the membrane. The detected holes may then be repaired by spot electroplating, such as by using a Hunter Micro-Metallizer Pen available from Hunter Products, Inc., Bridgewater, N.J. In FIG. 8, a patch, or plug, 62 is shown repairing hole 60. Any other suitable method may be used for repairing tiny holes resulting from etching the membrane.

The repairing step of the invented etching process also may be performed using a photolithographic method. In this case a light-sensitive, electrically insulating mask is applied to one surface of the membrane, and then the membrane is irradiated with light of the appropriate wavelength(s) from the opposite side. Any tiny holes that might be present in the membrane will allow the light to pass through the membrane and be absorbed by the light-sensitive mask. Next, the mask is washed to remove irradiated regions of the mask and thereby reveal the bare metal of the membrane. Because only the irradiated regions of the mask are removed, the remaining mask serves as an electrical insulator over the surface of the membrane. Then, all of the spots where the mask has been removed are electroplated or electroless-plated at the same time.

Because the patch, or plug, represents only a minute percentage of the surface area of the membrane, the patch may be formed from a material that is not hydrogen-permeable without the flux through the membrane being noticeably affected. Of course, a hydrogen-permeable and selective patch is preferred. Suitable metals for electroplating to fill or close tiny holes in the palladium-alloy membranes include copper, silver, gold, nickel, palladium, chromium, rhodium, and platinum. Volatile metals such as zinc, mercury, lead, bismuth and cadmium should be avoided. Furthermore, it is preferable that metal applied by plating be relatively free of phosphorous, carbon, sulfur and nitrogen, since these heteroatoms could contaminate large areas of the membrane and are generally known to reduce the permeability of palladium alloys to hydrogen.

The invented membranes may be used to form membrane modules adapted to be coupled to a source of hydrogen gas. The membrane modules include one or more hydrogen-permeable membranes and are adapted to remove impurities from a feed stream of hydrogen gas. It should be understood that the subsequently described membrane modules may be formed with the invented membranes, but that they may also be formed with other hydrogen permeable membranes. Similarly, the invented etched membranes may be used independent of the subsequently described membrane modules.

Figure 9:
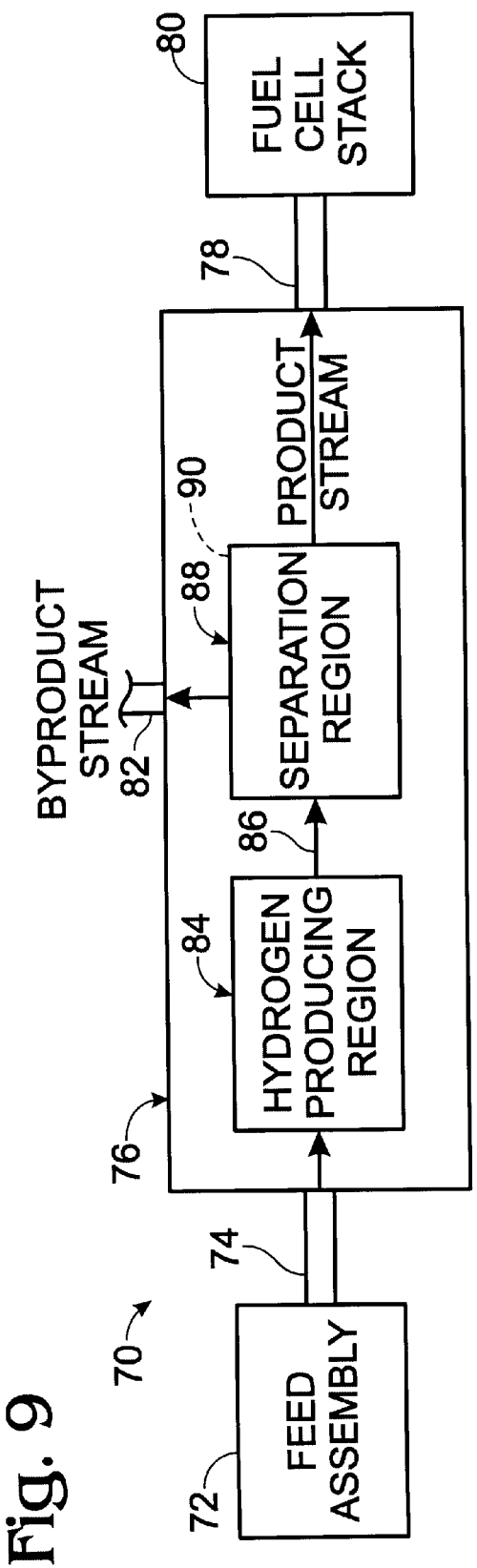
FIG. 9 is a schematic view of a fuel processing assembly.

A schematic example of a fuel processing assembly incorporating a membrane module is shown in FIG. 9 and generally indicated at 70. Assembly 70 includes a feed assembly 72 that is adapted to deliver one or more feed streams 74 to a fuel processor 76. Fuel processor 76 receives the feed streams and produces a product hydrogen stream 78 therefrom. In addition to product hydrogen stream 78, fuel processor 76 also produces one or more byproduct streams 82. These byproduct streams may be utilized for fuel, heat exchange, or feed. Alternatively, these streams may be harvested for use in other applications.

Fuel processor 76 is a device or assembly of devices adapted to produce hydrogen gas through any suitable mechanism from a single or multi-component feedstock comprising one or more feed streams. Examples of suitable mechanisms include steam reforming, partial oxidation, autothermal reforming and pyrolysis of a hydrocarbon or an alcohol, and electrolysis of water. It should be understood that the feedstock for fuel processor 12 will vary depending upon the particular form of fuel processor being used. For example, when fuel processor 76 produces hydrogen through steam reforming, the feedstock will typically include water and an alcohol or hydrocarbon. Autothermal reforming will also include a water component or stream as a part of the feedstock, however, pyrolysis and partial oxidation will not.

Product hydrogen stream 78 may be stored in a suitable storage device, such as a hydride bed or storage tank, or delivered for use in processes requiring purified hydrogen gas. For example, in FIG. 9, product hydrogen stream 78 is shown being delivered to a fuel cell stack 80. Fuel cell stack 80 includes at least one fuel cell, and typically includes multiple fuel cells coupled together. The fuel cell stack receives hydrogen gas from the fuel processor and produces an electric current therefrom as the hydrogen gas is reacted with oxygen to form water. The electric current produced by the fuel cell stack is then used to meet the electric load applied by one or more associated devices, such as vehicles, households, generators, boats, etc. Examples of suitable fuel cells include proton exchange membrane (PEM) fuel cells and alkaline fuel cells.

Fuel processor 76 includes a hydrogen producing region 84, in which a hydrogen-containing stream, or mixed gas stream, 86 is produced from the feed streams. The hydrogen-containing stream typically contains impurities, and therefore is delivered to a separation region, or purification region, 88, where the stream is purified. In the separation region 88, the hydrogen-containing stream is separated into product hydrogen stream 78 and a byproduct stream 82. Separation region 88 includes a membrane module 90, which contains one or more hydrogen permeable metal membranes, such as those discussed herein.

Region 88 may also be referred to as a purification assembly or separation assembly. Purification assembly 88 is in communication with fuel processor 76 and adapted to receive the mixed gas stream containing hydrogen gas (and other components) from hydrogen producing region 84. Assembly 88 may be contained within fuel processor 76, such as within the housing of the fuel processor. Alternatively, region 88 may be mounted on the housing of the fuel processor. In a further variation, purification assembly 88 may be physically separated from the fuel processor, but still in fluid communication therewith, such as through the use of piping or other fluid transportation lines or mechanisms.

An example of a membrane module formed from a plurality of hydrogen-selective metal membranes is disclosed in U.S. patent application Ser. No. 09/291,447, which was filed on Apr. 13, 1999, is entitled "fuel processing system," issued on Apr. 24, 2001 as U.S. Pat. No. 6,221,117, and the complete disclosure of which is hereby incorporated by reference. In that application, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels.

The thin, planar, hydrogen-permeable membranes are preferably composed of palladium alloys, most especially palladium with 35 wt % to 45 wt % copper. These membranes are typically formed from a thin foil that is approximately 0.001 inches thick. It is within the scope of the present invention, however, that the membranes may be formed from hydrogen-selective metals and metal alloys other than those discussed above and that the membranes may have thicknesses that are larger or smaller than discussed above. For example, the membrane may be made thinner, with commensurate increase in hydrogen flux, such as by the above-described etching process. The hydrogen-permeable membranes are arranged in pairs around a common permeate channel as is disclosed in the incorporated patent applications.

Figure 10:
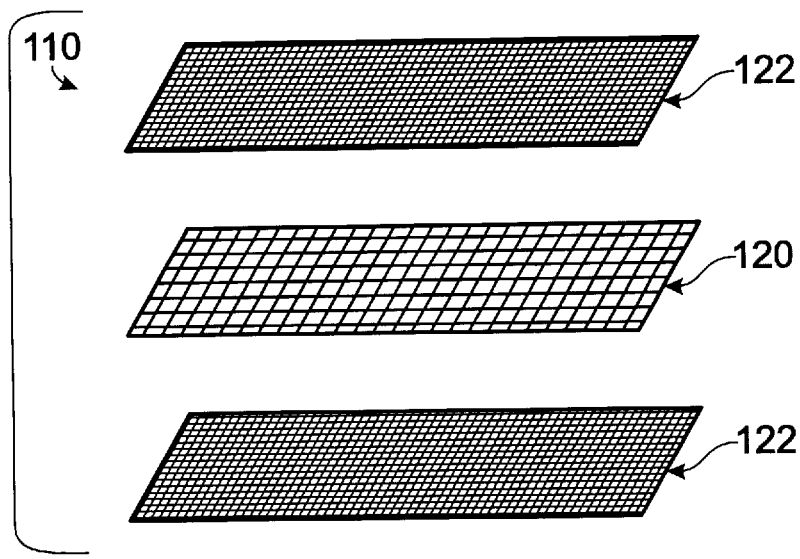
FIG. 10 is an exploded isometric view of a screen structure used to support hydrogen-selective metal membranes.

To support the membranes against high feed pressures, a sandwiched screen (woven wire mesh) structure 110 is used. Screen structure 110 may also be referred to as a spacing assembly or support structure. Screen structure 110 consists of a fine mesh on the outer surfaces of a coarser mesh. An example of such a screen structure is shown in FIG. 10, in which a coarse mesh screen 120 is sandwiched between opposed screens 122 of fine mesh. According to the method of the present invention, an adhesive, such as a contact adhesive, is used to secure the metal membranes to the screen structure. An example of a suitable adhesive is sold by 3M under the trade name SUPER 77. The adhesive may also be used to adhere the fine mesh sheets 122 to the coarse mesh screen 120.

The use of adhesive allows the sandwiched screen structure to be made flat and planar. And the use of adhesive allows the thin membrane to be firmly attached to the rigid support screen sandwich without any wrinkles in the membrane. It is important that these components be held flat and in close contact during assembly of the membrane module. If the membrane buckles, or if the screen structure buckles, then a wrinkle will form in the membrane during use. Similarly, if the membranes are improperly positioned relative to the screen structure, wrinkles may also occur, such as when the membrane module is pressurized. As pointed out above, wrinkles in the membrane lead to stress fractures and fatigue fractures, causing failure of the membrane module and contamination of the purified gas stream.

Figure 11:
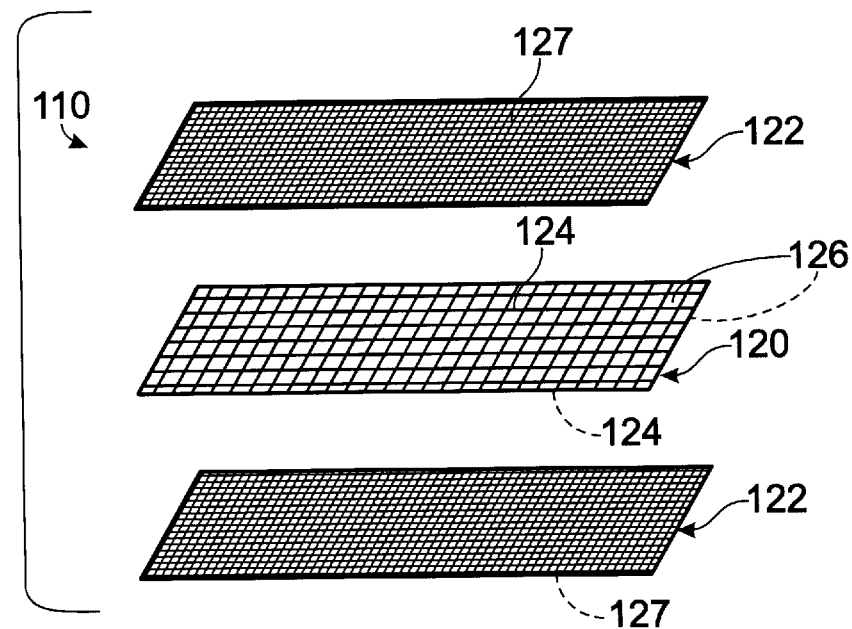
FIG. 11 is an exploded isometric view of the screen structure of FIG. 10 with an adhesive used to bond the screens together.

In practice and as shown in FIG. 11, a light coating of contact adhesive 124 is sprayed or otherwise applied to the two opposing major surfaces 126 of the coarse screen 120 and then two fine screens 122 and 122' are attached, one to each major surface of the coarse screen. Adhesive 124 holds the fit sandwiched screen structure 110 together.

Alternatively, the adhesive could be applied to screens 122 and 122' instead of being applied to the coarse screen. Similarly, adhesive is applied between the corresponding surfaces of the fine mesh screens and the membranes to be attached thereto. Hydrogen-selective membranes may then be adhesively secured to the opposed surfaces 127 of the fine mesh screens.

Figure 12:
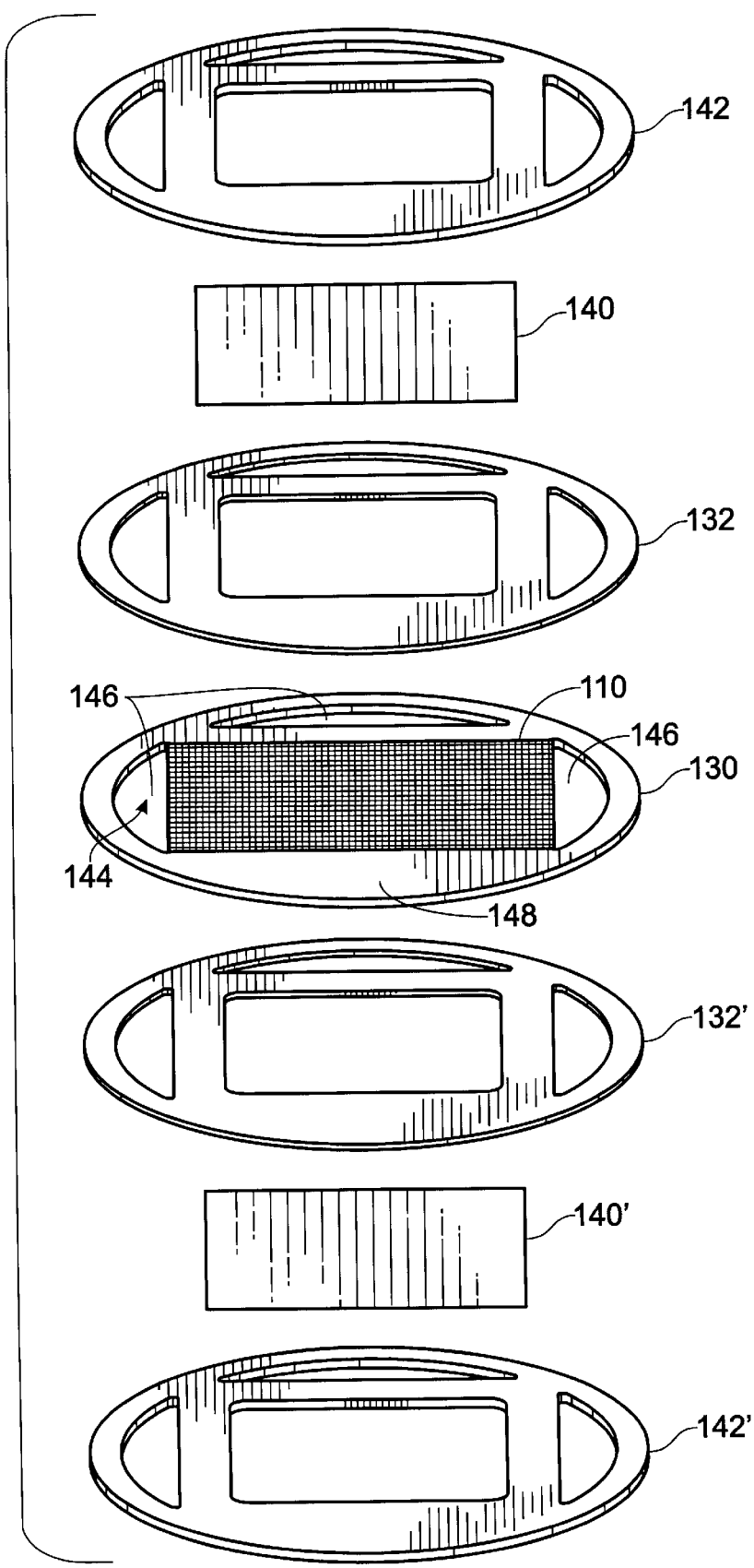
FIG. 12 is an exploded isometric view of a membrane module constructed according to the present invention.

Preferably, the screen structure and membranes are incorporated into a membrane module that includes supporting frames, gaskets and other structure for adapting the supported membranes for use in fuel processing systems, gas purification systems, and the like. Referring to FIG. 12, sandwiched screen structure 110 also may be placed in a permeate frame 130 forming part of a membrane module 128. Permeate gaskets 132 and 132' are attached to permeate frame 130, preferably but not necessarily, by using another thin application of adhesive. Next, thin, planar membranes 140 and 140' are attached to sandwiched screen structure 110 using a thin application, by spraying or other means, of adhesive. Care is taken to ensure that the thin membrane is flat and firmly attached to the support screen. Finally, feed gaskets 142 and 142' are optionally attached, again using a thin application of adhesive. The resulting membrane assembly is then stacked with feed plates and other membrane assemblies to make a membrane module.

Typically, frame 130 is formed of a structural supportive material that is stable at the operating temperatures of the membrane module and that does not react or otherwise interfere with the separation process being performed in the membrane module. Examples of suitable materials include steel, stainless steel, and stainless steel alloys, such as with nickel, iron, or copper. Frame 130 includes an aperture 144 sized to receive screen structure 110. Frame 130 typically has a thickness that is at least as thick as screen structure 110 and preferably has a thickness that is at least substantially the same as that of screen structure 110. For example, frame 130 and screen structure 110 may be approximately 0.025 inches thick. Other thicknesses and shapes may be used, including thicknesses that are larger or smaller than 0.025 inches. In FIG. 12, it can also be seen that aperture 144 includes portions 146 through which gas may flow, and a baffle portion 148 through which no gas may flow.

Gaskets 132, 132', 142 and 142' typically are formed of a compressible material that is stable at the operating temperatures of the membrane module and that does not react or otherwise interfere with the separation process being performed in the membrane module. Examples of suitable materials include flexible graphite, copper and other suitable mineral compositions alone or in a composite with graphite. Permeate gaskets 132 and 132' typically are thinner than frame 130, with a thickness of approximately 0.005 inches before compression proving effective. Feed gaskets 142 and 142' typically are thicker than permeate gaskets, with a thickness of approximately 0.02 inches before compression proving effective. It should be understood that the gaskets may have any suitable thickness that enables the gasket to create the desired seal without interfering with the operation of membrane module 128.

Figure 13:
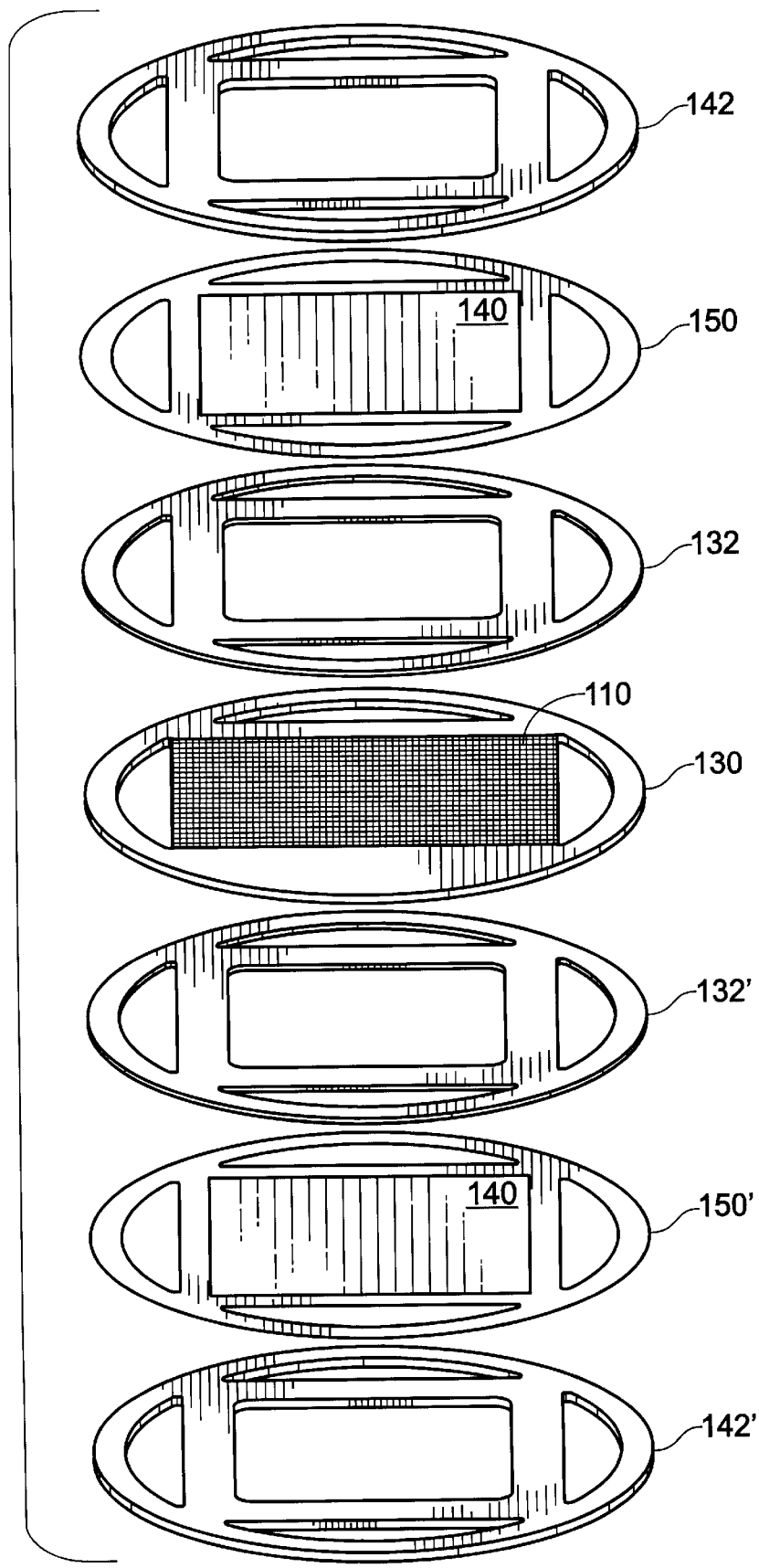
FIG. 13 is an exploded isometric view of another embodiment of a membrane module constructed according to the present invention.

Optionally, membranes 140 may be fixed to a metal frame as is disclosed in the above incorporated U.S. patent application Ser. No. 09/291,447. If so, the membrane is fixed to the frame, for instance by ultrasonic welding, and the membrane-frame assembly is then attached to screen structure 110 using adhesive 124. An example of such a membrane module is shown in FIG. 13, in which membranes 140 are mounted on frames 150 and 150'.

It should be understood that the geometry of the gaskets, membranes and screens shown in FIGS. 10–13 are provided as illustrative examples, and it should be understood that these components may be of any suitable shape. Similarly, the configuration and orientation of the passages through the gaskets and plates may vary, depending upon the particular application with which the membrane module will be used.

Membrane modules made using the membrane assemblies fabricated using adhesive as described above must be subjected to oxidizing conditions prior to initial operation of the membrane module to remove the adhesive. If adhesive is not fully removed prior to operation, the carbon residue from the adhesive can alloy with the palladium-alloy membrane and cause a decline in hydrogen permeability. In extreme cases, carbon alloying with the palladium-alloy membrane can form a brittle alloy that physically fails under operating conditions.

The objective of the oxidative conditioning is to burn out the adhesive without excessively oxidizing the palladium-alloy membrane. One set of suitable conditions using the above membrane compositions and adhesive is to heat the membrane module to 200° C. while passing air over both the feed side and the permeate side of the membrane. A preferred method is to heat the membrane module to 200° C. while the feed side is pressurized to a pressure greater than the permeate side of the membranes using a slow purge of air (>1 mL/min). Pressures in the range of approximately 50 psig to approximately 200 psig have proven effective. Air at approximately ambient pressure is passed over the permeate side of the membrane at a rate >1 mL/min. These conditions are maintained for approximately 15–25 hours. Then the temperature is increased to 400° C., while maintaining air pressure and flow rate over the feed and permeate sides of the membranes. The temperature is held at 400° C. for approximately 2–5 hours. After completing this oxidative conditioning of the membrane module, the adhesive has been burned out of the membrane module and the module is ready to accept a hydrogen-containing feed stream to be purified. Experiments have shown that these methods result in membrane modules containing membranes that are free of wrinkles and without excessive carbon contamination.

It should be understood that the conditions described above were presented to provide an illustrative example and that the operating conditions may vary. For example, different conditions may be used because of such factors as different membrane compositions, different membrane thicknesses, and different adhesives. Similarly, the invented method using an adhesive to secure hydrogen-selective membranes on one or more support screens may be used with purification assemblies other than the fuel processing assemblies described in the incorporated patent applications.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the claims recite "a" or "a first" element or the equivalent thereof, such claims should be understood to include incorporation of one or more such elements, neither requiring nor excluding two or more such elements.

The following claims recite certain combinations and subcombinations that are directed to one of the disclosed inventions and are believed to be novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A hydrogen purification assembly, comprising:
a membrane assembly adapted to receive a mixed gas stream containing hydrogen gas and other components and to separate the mixed gas stream into a product hydrogen stream and a byproduct stream, wherein the membrane assembly includes at least one hydrogen permeable metal membrane through which a portion of the mixed gas stream passes and a portion of the mixed gas stream does not pass, wherein the portion of the mixed gas stream that passes through the membrane forms the product stream and contains hydrogen gas and the portion of the mixed gas stream that does not pass through the membrane forms the byproduct stream and contains at least a substantial portion of the other components, wherein the at least one hydrogen permeable metal membrane includes an etched region having a reduced thickness compared to an unetched membrane region, and further wherein the etched region is formed by an etching process that provides the etched region with an irregular, non-uniform thickness and therefore an increased surface area compared to a uniformly etched or unetched region.

2. The assembly of claim 1, wherein the at least one hydrogen permeable metal membrane includes an unetched region having a thickness greater than the thickness of the etched region.

3. The assembly of claim 2, wherein the unetched region at least partially surrounds the etched region.

4. The assembly of claim 2, wherein the unetched region completely surrounds the etched region.

5. The assembly of claim 2, wherein the unetched region is mounted on a frame.

6. The assembly of claim 1, wherein the membrane assembly includes at least one pair of spaced-apart hydrogen permeable metal membranes defining a permeate channel therebetween, and further wherein the channel includes an outlet through which the product hydrogen stream may be removed from the membrane assembly, wherein the permeate channel includes a support structure that extends between the membranes and permits hydrogen gas that permeates through the membranes to flow therethrough in directions both parallel and transverse to the membranes.

7. The assembly of claim 6, wherein each of the hydrogen permeable metal membranes has a generally planar configuration.

8. The assembly of claim 6, wherein the support structure includes at least one mesh screen.

9. The assembly of claim 8, wherein the support structure includes a plurality of mesh screens.

10. The assembly of claim 9, wherein the plurality of mesh screens includes a pair of screens separated by a coarser central screen.

11. The assembly of claim 9, wherein the plurality of mesh screens are adhesively bonded together.

12. The assembly of claim 6, wherein the pair of membranes are secured to the support structure.

13. The assembly of claim 6, wherein the pair of membranes are adhesively secured to the support structure during assembly of the membrane assembly and thereafter subjected to oxidizing conditions to remove the adhesive prior to use of the membrane assembly to separate the mixed gas streams into the product and byproduct streams.

14. The assembly of claim 1, wherein the etched region is adapted to permit a greater hydrogen flux than a theoretically expected hydrogen flux through an unetched membrane region having the same composition and thickness as the etched membrane region.

15. The assembly of claim 14, wherein the etched region is adapted to permit a hydrogen flux that is at least 10% greater than the theoretically expected hydrogen flux through an unetched membrane region having the same composition and thickness as the etched membrane region.

16. The assembly of claim 14, wherein the etched region is adapted to permit a hydrogen flux that is at least 20% greater than the theoretically expected hydrogen flux through an unetched membrane region having the same composition and thickness as the etched membrane region.

17. The assembly of claim 14, wherein the etched region does not require chemical or physical reactivation after etching to be adapted to permit a hydrogen flux that is at least as great as the hydrogen flux expected for a membrane having the same composition and thickness as the etched membrane region.

18. A hydrogen purification assembly, comprising:
a membrane assembly adapted to receive a mixed gas stream containing hydrogen gas and other components and to separate the mixed gas stream into a product hydrogen stream and a byproduct stream, wherein the membrane assembly includes at least one hydrogen permeable metal membrane through which a portion of the mixed gas stream passes and a portion of the mixed gas stream does not pass, wherein the portion of the mixed gas stream that passes through the membrane forms the product stream and contains hydrogen gas and the portion of the mixed gas stream that does not pass through the membrane forms the byproduct stream and contains at least a substantial portion of the other components, wherein the at least one hydrogen permeable metal membrane includes a perimeter region adapted to permit a first hydrogen flux therethrough and a central region adapted to permit a greater hydrogen flux therethrough than the perimeter region, and further wherein the central region is etched to permit a greater hydrogen flux than a theoretically expected hydrogen flux through an unetched membrane region having the same composition and thickness as the central etched membrane region.

19. The assembly of claim 18, wherein the central region has a reduced thickness relative to the perimeter region.

20. The assembly of claim 18, wherein the central region has an increased roughness compared to the perimeter region.

21. The assembly of claim 18, wherein the central region has a greater surface area per selected expanse than an equally sized expanse of the perimeter region.

22. The assembly of claim 18, wherein the central region is etched to permit a hydrogen flux that is at least 10% greater than the theoretically expected hydrogen flux through an unetched membrane region having the same composition and thickness as the central region.

23. The assembly of claim 18, wherein the central region is etched to permit a hydrogen flux that is at least 20% greater than the theoretically expected hydrogen flux through an unetched membrane region having the same composition and thickness as the central region.

24. The assembly of claim 18, wherein the central region is an etched region that does not require chemical or physical reactivation after etching to be adapted to permit a hydrogen flux that is at least as great as the hydrogen flux expected for a membrane having the same composition and thickness as the central region.

* * * * *